UNITED STATES PATENT OFFICE.

FREDERICK C. NORFOLK, OF DES MOINES, ASSIGNOR TO THE NORFOLK MANUFACTURING COMPANY, OF OTTUMWA, IOWA.

PERFUMED STARCH AND PROCESS OF MAKING THE SAME.

SPECIFICATION forming part of Letters Patent No. 480,669, dated August 9, 1892.

Application filed October 24, 1891. Serial No. 409,715. (No specimens.)

*To all whom it may concern:*

Be it known that I, FREDERICK C. NORFOLK, a citizen of the United States, residing at Des Moines, in the county of Polk and State of Iowa, have invented certain new and useful Improvements in Perfumed Starch and the Process of Producing the Same; and I do hereby declare the following to be a full, clear, and exact description of the invention, such as will enable others skilled in the art to which it appertains to make and use the same.

This invention relates to what I am pleased to call "perfumed starch" and to the method of producing the same; and the object in view is to produce in an expeditious, cheap, and efficient manner a starch which will retain its perfume for a long time, prevent evaporation or essential waste of the oil or liquid used as the perfume, and will impart to the fabric containing the starch a superior finish and gloss, a pleasant odor, and, in a measure, seals or closes the pores of the fabric, thereby retaining the perfume for a long period of time.

With these ends in view the invention consists in a starch in which ordinary or plain dry starch has combined and mixed with it liquid perfume or essential oils and other ingredients which operate to retain the perfume and prevent its evaporation and waste. The ingredients used are paraffine and borax in about the proportions of one-half ounce and one and a half ounces, respectively, of the paraffine and borax to about fourteen ounces of starch; but these proportions may vary.

The invention further consists in the composition of matter and in the method of making the starch, as will be hereinafter fully explained.

My starch consists of the following ingredients in and about the proportions stated, viz: dry powdered starch, fourteen ounces; paraffine, one and one-half ounces; powdered borax, one-half ounce, and perfume or essential oil in suitable quantity, about fifty drops of liquid perfume or one-tenth to one-twentieth of the whole perfume in essential oils.

In preparing my perfumed starch I first take a suitable quantity of paraffine and treat it by subjecting the same, according to its condition, to heat or cold, so as to bring its temperature to about 35° or 40° Fahrenheit, whereby it is reduced to a solid block or cake. This solid block is now grated or reduced to very fine particles and to the grated mass is added about fifty drops of liquid perfume of any suitable variety and flavor, the paraffine and perfume being thoroughly mixed by agitation in a suitable vessel. I now mix the commingled paraffine and perfume with the proper quantity of dry powdered starch and powdered borax, the mass being thoroughly commingled by agitation. After this the whole mass is deposited in a suitable grinding-mill and ground or reduced to very fine particles, particularly the paraffine. I have found by experiments that the operation of grinding the mass serves to more intimately mix the paraffine with the borax and starch than can be accomplished in any other manner; and, furthermore, the paraffine being wet or moistened with the perfume and the starch being ground very finely, the starch adheres to the perfumed paraffine, and being ground together the ingredients are more intimately mixed. The paraffine serves to retain the perfume, and as the ingredients are ground in the mill there is a tendency to raise the temperature of the product to a certain degree, which partially dries the perfume and causes it to more thoroughly permeate the entire mass, which adds greatly to the desirability of the starch, as there is no possibility of the perfume evaporating and becoming spent after treatment according to my process and the starch can be exposed in the open air without deterioration.

As before intimated, I do not restrict myself to the use of liquid perfumery, but hold myself at liberty to use a small proportion of essential oils in connection with the liquid perfume. I also hold myself at liberty to use equivalent substances for the paraffine.

The improved starch can be used in the ordinary way, the same as common lump-starch, and as the paraffine is very sensitive to heat it will impart to a collar, cuff, shirt, or other fabric a very brilliant and lustrous appearance, as well as imparting to the article a very pleasant odor. Furthermore, the composition of the starch is such that in practice it closes or seals the pores of the article and retains the perfume for a longer time.

Having thus described my invention, what I claim as new, and desire to secure by Letters Patent, is—

1. As a new article of manufacture, perfumed starch consisting of ordinary dry powdered starch mixed with paraffine saturated with a perfume, said paraffine and perfume being intimately ground into and combined with the starch, substantially as and for the purpose described.

2. A perfumed starch comprising ordinary dry powdered starch, borax, and paraffine saturated with perfume and ground into the starch and borax, substantially as described.

3. The method of producing perfumed starch, which consists in mixing paraffine and a perfume with powdered starch and then heating the mass and reducing the same to a very fine powder by grinding the whole until its temperature rises to a point where the perfume is dried and caused to thoroughly permeate the mass, for the purpose described, substantially as set forth.

4. The method of producing perfumed starch, which consists in reducing solidified paraffine to a fine comminuted state, as by grating, moistening the same with a liquid perfume, mixing the moistened paraffine with powdered starch, and finally grinding the whole mass to reduce it to very fine particles and thereby raise the temperature of the mass to a point where the perfume becomes dry and thoroughly permeates the whole mass, substantially as described.

In testimony whereof I affix my signature in presence of two witnesses.

FREDERICK C. NORFOLK.

Witnesses:
S. BACHMANN,
C. F. MORRELL.